United States Patent Office 3,140,304
Patented July 7, 1964

3,140,304
PROCESS FOR THE PREPARATION OF ARYL MERCURIC BENZOATES
Sergey V. Chodsky, Fort Lee, and Marvin Rosen, Scotch Plains, N.J., assignors, by mesne assignments, to Heyden Newport Chemical Corporation, a corporation of Delaware
No Drawing. Filed Apr. 24, 1962, Ser. No. 189,715
9 Claims. (Cl. 260—434)

This invention relates to a process for the preparation of aryl mercuric salts. More particularly, it relates to a process for the preparation of aryl mercuric salts having the formula R—Hg—A wherein R represents a mononuclear aryl group, for example, a phenyl group, a tolyl group, a xylyl group, an aminophenyl group, a nitrophenyl group, a hydroxyphenyl group, or a chlorophenyl group, and A represents an aromatic monocarboxylic acid radical, for example, a benzoic acid radical, a chlorobenzoic acid radical, a hydroxybenzoic acid radical, a nitrobenzoic acid radical, or an aminobenzoic acid radical.

In the past these aryl mercuric salts of aromatic acids, which are potent fungicides and bactericides that may be used to protect paper, textiles, leather, paint, and the like from attack by these microorganisms, have been prepared by heating the appropriate aryl mercuric hydroxide with an aromatic monocarboxylic acid. The glassy products obtained, which may be contaminated with unreacted starting materials and reaction by-products, is difficult to handle and must be crystallized from alcohol or another solvent before use. Such a procedure, in addition to being time-consuming and costly to carry out, often results in sizeable losses of the salts during the crystallization step.

In accordance with the present invention it has been found that these aryl mercuric salts may be prepared in crystalline form in substantially quantitative yield by reacting an aryl mercuric acetate with an alkali metal salt of an aromatic monocarboxylic acid under the conditions hereinafter set forth. The crystalline salts so prepared are easy to handle, and they may be readily separated from reaction by-products and other impurities by washing with water. The present process is more economical than that previously used for the preparation of these salts in that it may be carried out in simple equipment, in that it does not require the use of organic solvents, and in that it gives a substantially quantitative yield of a high-quality, crystalline product. This process may be operated in either a batchwise or continuous manner. In the present process finely-divided aryl mercuric acetate is suspended in an aqueous solution of an alkali metal salt of an aromatic monocarboxylic acid. The suspension is then heated with stirring until the conversion of the acetate to the aryl mercuric salt of the aromatic acid is complete. During the heating period the small amounts of the aryl mercuric acetate that are dissolved in the aqueous medium react with the alkali metal salt to form the corresponding aryl mercuric salt of the aromatic acid. The latter salt, which is even less soluble in water than the acetate, crystallizes from the reaction mixture. Throughout the heating period, therefore, the reaction mixture is a suspension of the aryl mercuric acetate and the aryl mercuric salt of the aromatic acid in an aqueous medium containing the alkali metal acetate and the alkali metal salt of the aromatic acid. If a product having a high degree of purity and the desired crystalline form is to be obtained, it is necessary that the temperature at which the reaction is carried out be below and preferably at least 5° C. below the melting point of the mixture of mercuric salts.

The aryl mercuric salts that may be used as the starting material in the present process have the formula R—Hg—Ac wherein R has the aforementioned significance and Ac represents an acetate radical. Illustrative of these salts are phenylmercuric acetate, chlorophenylmercuric acetate, tolylmercuric acetate, and p-hydroxphenyl acetate. These salts may be used in the form of a finely-divided solid or in the form of an aqueous suspension containing at least approximately 40% by weight of the finely-divided salt. They are preferably added as aqueous suspensions containing approximately 40% to 75% by weight of the salt.

The salts with which the aryl mercuric acetates are reacted in the present process are alkali metal salts of aromatic monocarboxylic acids. Illustrative of these salts are sodium benzoate, potassium benzoate, lithium benzoate, sodium chlorobenzoate, sodium p-hydroxybenzoate, and potassium p-hydroxybenzoate. Preferably the sodium salts of the aromatic acids are used in this process. The alkali metal salts are ordinarily added as aqueous solutions that contain from approximately 15% by weight of the salt to the amount of the salt that is required to form a saturated solution at the temperature at which the reaction is begun. In most cases solutions containing approximately 20% to 30% by weight of the salt are used. The pH of these solutions is generally in the range of 6.5 to 7.5 and preferably 6.7 to 7.0.

The concentrations of the salts in each of the starting materials are not critical; it has been found, however, that crystalline products having a high degree of purity result when the reaction mixture contains approximately 20% to 50% by weight and preferably 20% to 35% by weight of the aryl mercuric salt.

The relative amounts of the reactants used may be varied within wide limits. To obtain products that are substantially free from unreacted aryl mercuric acetate, it is necessary that the amount of the alkali metal salt that is present be at least stoichiometrically equivalent to that of the aryl mercuric acetate. Generally a 5% to 50% molar excess of the alkali metal salt is used.

The aryl mercuric acetate and alkali metal salt may be combined in any convenient manner. The aryl mercuric acetate may be added to the alkali metal salt solution, the alkali metal salt solution may be added to the aryl mercuric acetate suspension, or the salts may be added simultaneously. Alternatively, an alkali metal hydroxide, carbonate, or bicarbonate may be added to a mixture of the aromatic monocarboxylic acid, aryl mercuric acetate, and water to form the reaction mixture.

In a preferred embodiment of the invention a suspension of finely-divided aryl mercuric acetate is slowly added at a uniform rate to an aqueous alkali metal salt solution to form the reaction mixture. The rate at which the aryl mercuric acetate is added is not critical; in most cases the addition is completed in a period of approximately 30 minutes to six hours. During the addition of the aryl mercuric salt the temperature of the reaction mixture is maintained in the range of approximately 5° C. to 30° C. and preferably 20° C. to 25° C.

The reaction mixture, which is a suspension of aryl mercuric acetate in an aqueous alkali metal salt solution, is then gradually heated to approximately 30° C. to 65° C. and preferably 50° C. to 65° C. The rate at which the temperature is raised is such that the temperature of the reaction mixture is always at least approximately 5° C. below the melting point of the suspended mixture of aryl mercuric salts. The reaction mixture is heated at the aforementioned temperature until substantially all of the aryl mercuric acetate has been converted to the aryl mercuric salt of the aromatic acid. The product is then separated from the reaction medium by filtration or another suitable procedure, washed with water, and dried.

This invention is further illustrated by the examples that follow. It is to be understood, however, that these examples are given merely for the purpose of illustration and are not to be construed as being limitative.

*Example 1*

A suspension that contained 42% by weight of phenylmercuric acetate was prepared by adding 186 grams of water to 261.5 grams of an aqueous phenylmercuric acetate suspension that contained 72% of phenylmercuric acetate.

A sodium benzoate solution was prepared by dissolving 29.7 grams of sodium hydroxide in 196 grams of water and adding to this solution 90.6 grams of benzoic acid and 50 grams of water. The resulting solution contained approximately 28% by weight of sodium benzoate and had a pH of 6.8.

The phenylmercuric acetate suspension was added to the sodium benzoate solution at 20°–25° C. at a uniform rate over a period of two hours. The reaction mixture, which contained approximately 23% by weight of phenylmercuric acetate, was slowly heated to 55° C. and maintained at this temperature for 1 hour and 45 minutes. It was then heated at 63°–65° C. for 15 minutes and cooled. The resulting suspension was centrifuged to remove water from it. The filter cake was washed with water and dried at 50° C. There was obtained 221.3 grams of phenylmercuric benzoate.

*Example 2*

A sodium benzoate solution was prepared by dissolving 29.7 grams of sodium hydroxide in 196 grams of water and adding to this solution 90.6 grams of benzoic acid and 50 grams of water.

To the sodium benzoate solution at 20°–25° C. was added 188 grams of finely-divided phenylmercuric acetate at a uniform rate over a period of approximately two hours. The reaction mixture was slowly heated to 50° C. and maintained at this temperature for three hours. It was then heated at 60°–65° C. for 15 minutes and cooled. The resulting suspension was centrifuged to remove water from it. The filter cake was washed with water and dried at 50° C. A 99.2% yield of phenylmercuric benzoate was obtained.

*Example 3*

A phenylmercuric acetate suspension and a sodium benzoate solution were prepared by the procedures described in Example 1. The phenylmercuric acetate suspension was added to the sodium benzoate solution at 20° C. at a uniform rate over a period of three hours. The resulting suspension was heated at 35°–45° C. until substantially all of the phenylmercuric acetate had been converted to phenylmercuric benzoate and then filtered. The filter cake was washed with water and dried at 50° C. A 99% yield of crystalline phenylmercuric benzoate was obtained.

*Example 4*

To 447 grams of an aqueous suspension containing 42% by weight of phenylmercuric acetate at 20° was added 376 grams of a 25% aqueous sodium benzoate solution at a uniform rate over a period of two hours. The resulting suspension was slowly heated to 60°–65° C. and maintained at this temperature until substantially all of the phenylmercuric acetate had been converted to phenylmercuric benzoate. It was then filtered to remove water from it. The filter cake was washed with water and dried at 50° C. The crystalline product was obtained in a high yield.

What is claimed is:
1. The process for the preparation of aryl mercuric salts having the formula

R—Hg—A wherein R represents a mononuclear aryl group selected from the group consisting of phenyl, tolyl, xylyl, aminophenyl, nitrophenyl, hydroxyphenyl, and chlorophenyl groups and A represents an aromatic monocarboxylic acid radical selected from the group consisting of benzoic acid, chlorobenzoic acid, hydroxybenzoic acid, nitrobenzoic acid, and aminobenzoic acid radicals which comprises the steps of (1) forming an aqueous reaction mixture comprising (a) approximately 20% to 50% by weight of an aryl mercuric acetate having the formula

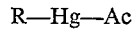

R—Hg—Ac wherein R has the aforementioned significance and Ac represents the acetate radical and (b) an alkali metal salt of an aromatic monocarboxylic acid selected from the group consisting of benzoic acid, chlorobenzoic acids, hydroxybenzoic acids, nitrobenzoic acids, and aminobenzoic acids, said alkali metal salt being present in an amount that is at least stoichiometrically equivalent to that of said aryl mercuric acetate, at a temperature in the range of approximately 5° C. to 30° C. and (2) heating said reaction mixture at a temperature in the range of approximately 30° C. to 65° C. thereby forming an aqueous suspension of the crystalline aryl mercuric salt of said aromatic monocarboxylic acid.

2. The process for the preparation of phenylmercuric salts having the formula

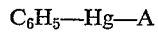

$C_6H_5$—Hg—A wherein A represents an aromatic monocarboxylic acid radical selected from the group consisting of benzoic acid, chlorobenzoic acid, hydroxybenzoic acid, nitrobenzoic acid, and aminobenzoic acid radicals which comprises the steps of (1) forming an aqueous reaction mixture comprising (a) approximately 20% to 50% by weight of phenylmercuric acetate and (b) an alkali metal salt of an aromatic monocarboxylic acid selected from the group consisting of benzoic acid, chlorobenzoic acids, hydroxybenzoic acids, nitrobenzoic acids, and aminobenzoic acids, said alkali metal salt being present in a stoichiometric excess, at a temperature in the range of approximately 5° C. to 30° C. and (2) heating said reaction mixture at a temperature in the range of approximately 30° C. to 65° C. thereby forming an aqueous suspension of the crystalline phenylmercuric salt of said aromatic monocarboxylic acid.

3. The process for the preparation of phenylmercuric benzoate comprising the steps of (1) forming an aqueous reaction mixture comprising approximately 20% to 50% by weight of phenylmercuric acetate and an alkali metal benzoate, said alkali metal benzoate being present in an amount that is at least equivalent stoichiometrically to the amount of phenylmercuric acetate, at a temperature in the range of approximately 5° C. to 30° C. and (2) heating said reaction mixture at a temperature in the range of approximately 30° C. to 65° C. until substantially all of said phenylmercuric acetate has been converted to phenylmercuric benzoate.

4. The process for the preparation of phenylmercuric benzoate comprising the steps of (1) formnig an aqueous reaction mixture comprising approximately 20% to 35% of phenylmercuric acetate and sodium benzoate, said sodium benzoate being present in an amount that is at least equivalent stoichiometrically to the amount of phenylmercuric acetate, at a temperature in the range of approximately 20° C. to 25° C., (2) gradually heating said reaction mixture to approximately 50° C.–65° C., and (3) heating the reaction mixture at said temperature until substantially all of said phenylmercuric acetate has been converted to phenylmercuric benzoate.

5. The process for the preparation of phenylmercuric benzoate which comprises the steps of (1) forming an aqueous solution containing at least 15% of sodium benzoate and having a pH in the range of approximately 6.5–7.5, (2) adding phenylmercuric acetate at a uniform rate to said sodium benzoate solution at a temperature in the range of approximately 5° C. to 30° C., the amount of phenylmercuric acetate added being less than equivalent stoichiometrically to the amount of sodium benzoate in said solution, (3) gradually heating the resulting suspension to a temperature in the range of approximately 30° C. to 65° C., and (4) heating said suspension at said temperature until substantially all of said phenylmercuric acid has reacted, thereby forming an aqueous suspension of crystalline phenylmercuric benzoate.

6. The process for the preparation of phenylmercuric benzoate which comprises the steps of (1) forming an aqueous solution containing at least 15% by weight of sodium benzoate and having a pH in the range of approximately 6.5–7.5, (2) adding at a uniform rate to said sodium benzoate solution at a temperature in the range of approximately 20° C. to 25° C. an aqueous suspension containing at least 40% by weight of phenylmercuric acetate, the amount of phenylmercuric acetate added being less than equivalent stoichiometrically to the amount of sodium benzoate in said solution, thereby forming an aqueous suspension containing approximately 20% to 35% by weight of phenylmercuric acetate, (3) gradually heating said suspension to a temperature in the range of approximately 50° C. to 65° C., (4) heating said suspension at said temperature until substantially all of said phenylmercuric acetate has been converted to phenylmercuric benzoate, and (5) recovering crystalline phenydmercuric benzoate from said suspension.

7. The process for the preparation of phenylmercuric benzoate which comprises the steps of (1) forming an aqueous solution containing approximately 20%–30% by weight of sodium benzoate and having a pH in the range of 6.7–7.0, (2) adding at a uniform rate to said sodium benzoate solution at a temperature in the range of approximately 20° C. to 25° C. an aqueous suspension containing at least 40% by weight of phenylmercuric acetate, the amount of phenylmercuric acetate added being less than equivalent stoichiometrically to the amount of sodium benzoate in said solution, thereby forming an aqueous suspension containing approximately 20% to 35% by weight of crystalline phenylmercuric acetate, (3) gradually heating said suspension to a temperature in the range of approximately 30° C. to 65° C., (4) heating said suspension at said temperature until a suspension of crystalline phenylmercuric benzoate substantially free from phenylmercuric acetate is obtained, and (5) recovering crystalline phenylmercuric benzoate from said suspension.

8. The process for the preparation of phenylmercuric benzoate which comprises the steps of (1) forming an aqueous solution containing approximately 20%–30% by weight of sodium benzoate and having a pH in the range of 6.7–7.0, (2) adding at a uniform rate to said sodium benzoate solution at a temperature in the range of approximately 20° C. to 25° C. an aqueous suspension containing at least 40% by weight of phenylmercuric acetate, the amount of phenylmercuric acetate added being less than equivalent stoichiometrically to the amount of sodium benzoate in said solution, thereby forming an aqueous suspension containing approximately 20% to 35% by weight of crystalline phenylmercuric acetate, (3) gradually heating said suspension to a temperature in the range of approximately 50° C. to 65° C., (4) heating said suspension at said temperature until a suspension of crystalline phenylmercuric benzoate substantially free from phenylmercuric acetate is obtained, and (5) recovering crystalline phenylmercuric benzoate from said suspension.

9. The process for the preparation of phenylmercuric benzoate which comprises the steps of (1) forming an aqueous solution containing approximately 20%–30% by weight of sodium benzoate and having a pH in the range of 6.7–7.0, (2) adding at a uniform rate to said sodium benzoate solution at a temperature in the range of approximately 20° C. to 25° C. an aqueous suspension containing approximately 40% to 75% by weight of phenylmercuric acetate to form an aqueous suspension containing approximately 20% to 35% by weight of phenylmercuric acetate and a 5% to 50% molar excess of sodium benzoate and, (3) gradually heating said suspension to a temperature in the range of approximately 50° C. to 65° C., (4) heating said suspension at said temperature until a suspension of crystalline phenylmercuric benzoate substantially free from phenylmercuric acetate is obtained, and (5) recovering crystalline phenylmercuric benzoate from said suspension.

References Cited in the file of this patent
UNITED STATES PATENTS

| | | |
|---|---|---|
| 2,177,049 | Anderson | Oct. 24, 1939 |
| 2,846,349 | Erskine et al. | Aug. 5, 1958 |